United States Patent [19]

Saito et al.

[11] 4,183,228

[45] Jan. 15, 1980

[54] DOUBLE EFFECT ABSORPTION REFRIGERATING SYSTEM COMPRISING

[76] Inventors: Shozo Saito; Naoyuki Inoue, both c/o Ebara Corporation, 11-1, Haneda Asahi-cho, Ota-ku, Tokyo, Japan

[21] Appl. No.: 886,571

[22] Filed: Mar. 14, 1978

[30] Foreign Application Priority Data

Mar. 22, 1977 [JP] Japan .................................. 52-31303

[51] Int. Cl.² .................. F25B 33/00; F25B 15/00
[52] U.S. Cl. ........................................ 62/497; 62/476
[58] Field of Search ............................ 62/476, 497, 489

[56] References Cited

U.S. PATENT DOCUMENTS

| | | | |
|---|---|---|---|
| 3,175,371 | 3/1965 | Harwich | 62/497 |
| 3,495,420 | 2/1970 | Loweth et al. | 62/497 |
| 3,550,394 | 12/1970 | Peckham | 62/497 |
| 3,651,654 | 3/1972 | Rachfal | 62/476 |
| 3,710,852 | 1/1973 | Porter | 62/476 |
| 3,721,109 | 3/1973 | Porter | 62/476 |
| 4,085,595 | 4/1978 | Saito et al. | 62/476 |

Primary Examiner—Lloyd L. King
Attorney, Agent, or Firm—Wenderoth, Lind & Ponack

[57] ABSTRACT

A double effect absorption refrigerating system having improved thermal efficiency is provided wherein a solution concentrated by a high pressure generator is, after being used to raise the temperature of a weak solution fed to the high pressure generator and before being fed into a low pressure generator, heated with heat energy transferred thereto from a refrigerant passed through a tube within the low pressure generator.

8 Claims, 6 Drawing Figures

DOUBLE EFFECT ABSORPTION REFRIGERATING SYSTEM COMPRISING

FIELD OF THE INVENTION

The present invention is related to a double effect absorption refrigerating system employing a plurality of generators and using a refrigerating medium and an absorbing liquid and more particularly to an improvement for utilizing heat energy which has heretofore been wasted by being discharged into the coolant in the system.

BACKGROUND OF THE INVENTION

Several double effect absorption refrigerating systems are known wherein a heated refrigerating medium is utilized to heat water or the like for several purposes in parallel with the refrigerating cycle.

For example, there are several U.S. Patents relating to double effect refrigeration such as U.S. Pat. Nos. 3,605,432; 3,651,654; 3,292,385; 3,530,684; and 3,266,266. However, in each of the systems disclosed in these prior art publications, heat energy in a refrigerant discharged from a low pressure generator or a second generator was lost or was discharged without being used by merely passing the vaporized refrigerant or liquid refrigerant carrying heat energy through a liquid sealing portion or trap into a cooling medium or water thereby wasting the heat energy without utilizing such energy to improve the efficiency of the refrigerating cycle. Also, the refrigerant used to effect heat transfer in the low pressure generator is generally passed through a pressure reduction means, such as a float valve or a throttle orifice, before being fed to a condenser. However, a gas-bypassing (vapor accompanied by liquid to be delivered) is transitionarily experienced where a float valve is used and it is also inevitable when a orifice is operated under conditions other than design conditions. Such passing of the refrigerant vapor also results in a great loss in heat energy since it retains a relatively large amount of heat energy.

Also, Japanese Pat. No. 647,515 issued to Hitachi Ltd. is prior art in this field; however, this is intended to avoid the problem of crystallization in a double effect absorption type refrigerator and to enlarge the available range of the concentration of the solution in the high pressure generator by parallely flowing the solution to a high pressure generator and a low pressure generator and returning the refrigerant to an absorber and there is no teaching of utilizing the wasted heat energy as discussed above.

Therefore, it is desirable to prevent such waste of heat energy thereby lowering the operating cost and improving the efficiency of the refrigeration cycle.

To such end, in the U.S. application Ser. No. 752,661 filed by the same inventors as those in this application, now U.S. Pat. 4,085,595, closed a novel system wherein the refrigerant passed through the low pressure generator and still carrying heat energy was intentionally directed to a heat exchanger where the remaining heat energy in the refrigerant was transferred to part of a weak solution bypassed from a feed line between a high level heat exchanger and a low level heat exchanger so as to utilize the heat energy heretofore wasted.

The system disclosed in the U.S. application referred to above satisfactorily increases the efficiency of the system. However, in that system, the solution discharged from a high pressure generator and introduced into the low pressure generator is utilized to heat the weak solution before its introduction into the high pressure generator at the high level heat exchanger located upstream of the high pressure generator and therefore it is cooled before being introduced into the low pressure generator. The solution is concentrated in the high pressure generator and, thus, that solution becomes stronger if it is cooled in the high level heat exchanger. Assuming that the respective temperatures of the condensed solution discharged from the high pressure generator and the weak solution which is bypassed as above are approximately the same, the ability of the concentrated solution to absorb heat is naturally higher and, thus, the capacity of the low pressure generator is affected more by the concentrated solution than the bypassed solution. Therefore, it is preferable, in order to further improve the efficiency of the low pressure generator or the whole system, to raise the temperature of the cooled concentrated solution rather than raising the temperature of the bypassed weak solution to be introduced into the low pressure generator. Also, if the return line of the concentrated solution directed to the low pressure generator is arranged to pass through an additional heat exchanger where heat exchange is effected between the concentrated solution and the refrigerant passed through the low pressure generator, it makes possible the designing of a construction incorporating such additional heat exchanger in the low pressure generator thereby making the whole system more compact.

SUMMARY OF THE INVENTION

Accordingly, it is an object of this invention to provide a double effect refrigerating system wherein the economic disadvantages of the prior art discussed above are obviated and the efficiency of the system is greatly increased by recovering and utilizing the heat energy heretofore wasted, especially in raising the temperature of rather strong solution to be introduced into a low pressure generator.

It is a further object of the present invention to provide a double effect absorption refrigerating system wherein the heat transferring efficiency of a low pressure generator is improved.

It is also an object of the present invention to provide a double effect absorption refrigerating system which is compact.

According to the present invention, the above described objects are achieved by a septum wherein a concentrated solution discharged from a high pressure generator and passed through a high temperature heat exchanger is passed through an additional heat exchanger where heat exchange is effected between the concentrated solution and the refrigerant passed through the second generator.

Also, according to some of the embodiments to be described hereinafter, the additional heat exchanger and the second generator are in a unitary structure thereby contributing to the compactness of the system in addition to the improvement in efficiency.

The present invention and its advantages will be further explained by the description of the preferred embodiments which follows the brief explanation of the drawings below.

DETAILED DESCRIPTION OF PREFERRED EMBODIMENTS

Figure 1:
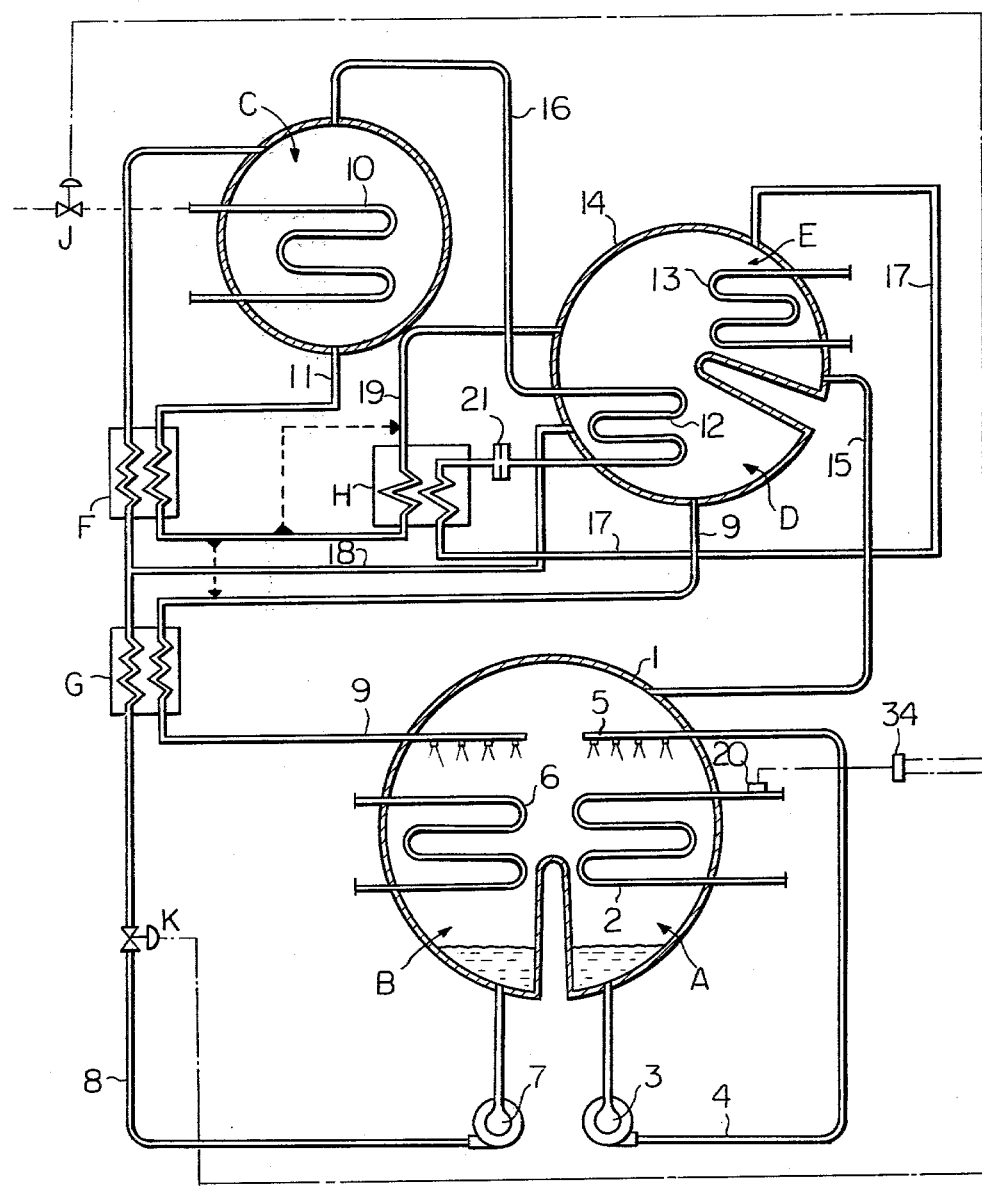
FIG. 1 is a schematic illustration of a a preferred embodiment of the system of the present invention.

In FIG. 1, there is shown a schematic illustration of the present invention. In the system illustrated in FIG. 1, there are provided an evaporator A, an absorber B, a first or high pressure generator C, a second or low pressure generator D, a condenser E, solution heat exchangers F and G, and a solution-refrigerant heat exchanger H. A vaporized refrigerant is directed from the first generator C to the second generator where the vapor is condensed and the refrigerant thus condensed vapor or the mixture of the condensed refrigerant and the vapor is thence transmitted to the evaporator A through the condenser E. However, as explained hereinafter, passing vapor to the condenser is effectively eliminated.

The evaporator A is, in the embodiment of FIG. 1, preferably constructed together with the absorber B within a single drum 1 and is provided with a chilled water conduit 2 and a refrigerant conduit 4 having therein a refrigerant pump 3 and a spray header 5. The absorber B is provided with a cooling medium or water conduit 6 and this absorber B is interconnected with the first generator C and the second generator D by means of a feed or weak solution conduit 8 and a return or strong solution conduit 9, respectively. The outlet end of the conduit 9 is preferably provided with a spray header. The weak solution is fed by a solution pump 7 provided in the passage 8 and the solution fed passes a low stage (low level) or second heat exchanger G and a high stage (high level) or first heat exchanger F provided in the conduit 8 to the first generator C. The generator C is provided with a heat generating tube 10 having a heat energy control valve J. The generator C is connected to a second generator D through solution return conduits 11 and 19, the former being arranged to pass through the first heat exchanger F and thence through a solution-refrigerant or third heat exchanger H whereupon it is connected to the conduit 19 which opens into the second generator D. The solution return conduit 9 for the strong solution from the second generator D is arranged to pass through the second heat exchanger G. The heat exchangers F and G are provided for improving the thermodynamic efficiency of the cycle. It is obvious that the temperature of the solution passing through the high stage or first heat exchanger F is higher than that passing through the low stage or second heat exchanger G.

The second generator D is provided with a generator tube 12 in which the refrigerant is fed from the first generator C to the second generator D through a refrigerant vapor conduit 16 coupled with the tube 12. As schematically shown, the generator D is preferably formed within a single drum 14 in which the condenser E is formed so as to communicate with the generator D. However, the condenser E may be disposed outside of the drum provided that the communication with the second generator D is maintained. The condenser E is provided with a condenser tube 13 and is coupled with a conduit 17 which is connected with the generator tube 12.

The refrigerant passing through the tube 12 heats the solution in the second generator and, after heating the solution in the second generator is transmitted through a throttle orifice 21 and the third heat exchanger H to the condenser E. The refrigerant is further transferred from the condenser E to the evaporator A through a conduit 15.

Further a bypass conduit 18 is provided so as to bypass the weak solution running through the conduit 8 to the second generator D. The bypass line 18 is preferably coupled to the conduit 8 downstream of the second heat exchanger G and upstream of the first heat exchanger F.

The operation of the the system illustrated in FIG. 1 will be briefly explained below.

The refrigerant evaporated in the evaporator A is absorbed into the solution in the absorber B and this weak solution is delivered by means of the pump 7 to the first generator C through the heat exchangers G and F. The solution is heated by means of the tube 10 in the first generator C and the refrigerant is discharged from the solution as vapor and directed to the second generator D through the conduit 16. In the second generator D, the refrigerant heats the solution therein while flowing through the generator tube 12 as explained before and is directed, through the line 17 having the throttle orifice 21 and the third heat exchanger H therein to the condenser E. On the other hand, the solution strengthened in the generator C is directed through the return conduit 11 to the first heat exchanger F where the heat energy of the solution is transmitted to the solution flowing from the absorber B to the first generator C. After the heat transfer at the first heat exchanger F, the solution is fed to the third heat exchanger H where it is again heated by the refrigerant passing through the line 17. Then the solution is fed to the second generator where the solution is further strengthened by means of the generator tube 12 to discharge the refrigerant as vapor. The vapor generated in the second generator enters the condenser E where it is condensed by a coolant flowing through the tube 13. The solution in the second generator D is fed to the second heat exchanger G through the return conduit 9 and the temperature of the solution is lowered by the heat transfer at the second heat exchanger. The solution is, thence, returned to the absorber B through the conduit 9. On the other hand, the refrigerant accumulated in the condenser E is returned to the evaporator A through the conduit 15. By carrying out the operation described above, the double effect refrigerating cycle can be repeated.

According to the embodiment illustrated in FIG. 1, the refrigerant vapor generated in the first generator C is utilized to heat the solution in the second generator D when it is passed through the generator tube 12. The refrigerant is cooled by the heat transfer above and it is naturally returned to its liquid state when it passes through the tube 12; however, the refrigerant is still kept at a relatively high temperature and, thus, it may sometimes contain refrigerant still remaining in the vapor state. The refrigerant passed through the tube 12 is fed through the throttle orifice 21 where the pressure of the refrigerant is lowered. At this stage, the pressure difference before and after the orifice 21 varies due to the volumetric change of the refrigerant and, therefore, it is inevitable that refrigerant vapor exists after the orifice and accompanies with the refrigerant liquid unless the design conditions exist at the orifice 21 in the present invention, the refrigerant transfer. However, succeeding to the orifice 21, the refrigerant transfers its heat to the solution at the third heat exchanger H through which the solution discharged from the first generator and cooled by the heat transfer at the first heat exchanger F is fed.

Therefore, the heat energy still possessed by the refrigerant passed through the throttle orifice which may accompany the refrigerant vapor is effectively utilized to raise the temperature of the solution cooled in the first heat exchanger F and also, the refrigerant possibly accompanying the vapor is cooled at the third heat exchanger thereby condensing the remaining vapor refrigerant to the liquid state. Accordingly, the arrangement just explained above will also effectively prevent the vapor refrigerant from passing to a condenser E which might create the loss of heat energy. Also, even if the heat exchange rate at the first heat exchanger F is raised thereby further lowering the temperature of the solution passing through the exchanger F, the solution is again given heat energy when it passes through the third exchanger H. Therefore, even once the temperature of the solution is lowered before being introduced into the second generator D, it is possible to reduce the energy loss in preheating the solution which has been cooled before discharging the solution into the second generator D and to increase the efficiency of the heat exchanger F thereby improving the total thermal efficiency of the system.

Also, according to the embodiment illustrated, it is easy to assure the proper flow rate of the solution in the second generator D by the utilization of the heat exchanger H and the bypass line 18, and therefore it is also possible to make the speed of solution an ideal value with respect to heat transfer efficiency in the second generator D and prevent the occurrence of crystallization of the solution due to the separation of the solution. Also, the heat exchangers F and H are individually provided so that it is possible to design these devices for independant operation at the optimum condition, thereby making the efficiency thereof high and enabling the design thereof to be compact.

In the foregoing explanation, all the absorbing solution passing through the first heat exchanger F is directed to the third heat exchanger H; however, it is possible to bypass part of that solution directly to the second generator D, the conduit 9 therefor being indicated by the broken lines.

Although in the illustrated preferred embodiment in FIG. 1, the external heat source employed is a medium such as steam or hot water flowing through the generator tube 10, any other external heat source such as one burning gas, oil etc. may be utilized as the heat source and, in this regard, the explanation or the embodiment is no way to be considered as limiting the scope or application of the present invention.

In the operation, operating conditions, the load to be cooled by the system, the atmospheric temperature and so on, under which the system operates naturally vary. Therefore, the amount of the external heat energy supplied to the first generator is preferably adjusted according to such factors. To such end, in the system illustrated in FIG. 1, there is provided a temperature detector 20 disposed in the outlet line of the chilled water conduit 2. In order to control the heat energy supplied to the first generator C, it is preferable to transmit the signal from the detector 20 so as to control the opening of the valve J by means of a control unit 34. Also, the supply of the weak solution from the absorber B may be controlled by the signal developed at the detector 20 through the control unit 34 which adjusts a valve K in the conduit 8. These control systems are schematically illustrated by chain lines in FIG. 1. Of course, the control of the system may performed by any other suitable means.

Figure 2:
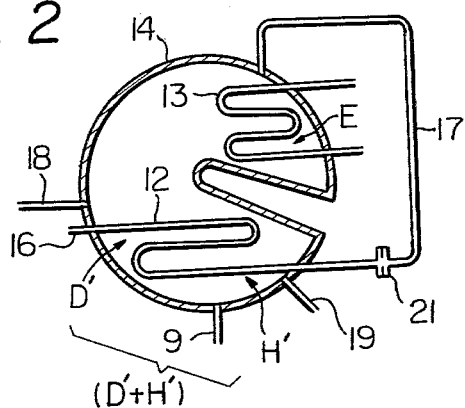
FIG. 2 is a schematic illustration of a combined additional heat exchanger and a low pressure or second generator.

In FIG. 2, there is shown an alternate embodiment of the present invention wherein a low pressure or temperature generator D' and a solution-refrigerant heat exchanger H' are constructed as a unitary or composite heat exchanger (D'+H'), the generator D' corresponding to the second generator D and the heat exchanger H' corresponding to the third heat exchanger H in FIG. 1, respectively. Other portions bearing the same references as those in FIG. 1 are to be considered the same as in FIG. 1.

It is noted that, throughout the specification and the appended claims, the terms "a low pressure generator", "a low temperature generator", "a second generator" or "a portion of such generator as above" are intended to indicate a first zone where heat transfer between the solution and the refrigerant and evaporation of the refrigerant are effected and located between an intake port adapted to receive the solution heated at the low level or second heat exchanger and an outlet port of a low pressure generator from which the concentrated or strong solution is discharged. Also, the terms "a solution-refrigerant heat exchanger", "a third heat exchanger" or "a portion of such heat exchanger as above" are intended to indicate a second zone other than the first zone described above and where heat transfer is effected between the solution and the refrigerant or even evaporation is effected, the refrigerant being, in this instance, one directed from the heating line in the second generator and still having heat energy to warm the solution.

Figure 3:
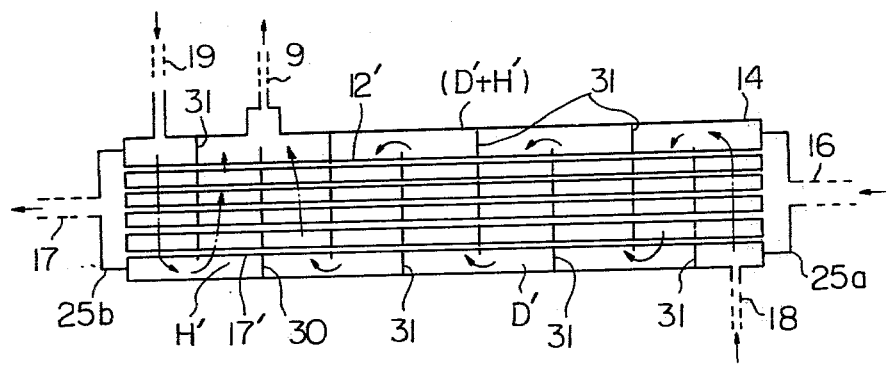
FIGS. 3–6 respectively schematically illustrate several practical embodiments of the construction shown in FIG. 2.

In FIG. 3, a sectional view of a practical form of a unitary or composite heat exchanger (D'+H') shown in FIG. 2 is schematically illustrated. The second generator portion D' and the third heat exchanger portion H' are separated by a baffle plate or portion 30 which permits communication between the two portions at the top thereof. At the opposite ends of the unitary heat exchanger, headers 25a and 25b are disposed, respectively and the opposite headers 25a and 25b are connected with each other by a plurality of conduits each of which consists of a generator tube portion 12' and a heating tube portion 17'. One of the headers, namely header 25a is connected to the refrigerant vapor conduit 16 and the other header 25b is connected to the line 17 so that the refrigerant in vapor form, liquid form or a combination thereof, passes through the conduits from the header 25a to the header 25b during which time it transfers its heat energy to the solution flowing through the respective portions D' and H'. As shown in this FIG. 3, the solution from the first generator is fed through the conduit 19 into the portion H' and is discharged through the return conduit 9 and the solution from the bypass line 18 is introduced into the portion D' and is discharged through the return conduit 9. In both portions, a suitable number of baffle plates 31 are preferably provided to promote the efficiency of heat transfer. Also, the portions D' and H' may carry out the respective functions satisfactorily even if the baffle plate 30 therebetween is omitted.

Figure 4:
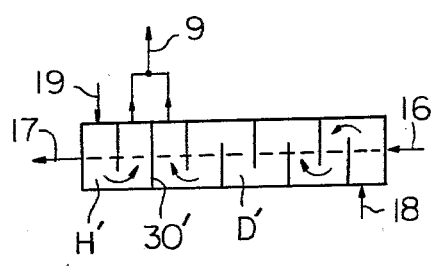

FIG. 4 illustrates a modification of the composite heat exchanger shown in FIG. 3. In the composite heat exchanger of FIG. 4, a baffle plate 30' completely separates the two portions D' and H' so that there remains no communication therebetween. However, in this embodiment, the portion H' is preferably given placed in communication with the condenser E so that the portion will become a flushing type which serves, under at a fixed pressure, not only to effect transfer of heat energy but also to concentrate the solution fed from the line 19 depending on the condition of the heat transfer. The portion D' naturally serves to concentrate the solution since this is one of the primary functions of the second generator.

Figure 5:
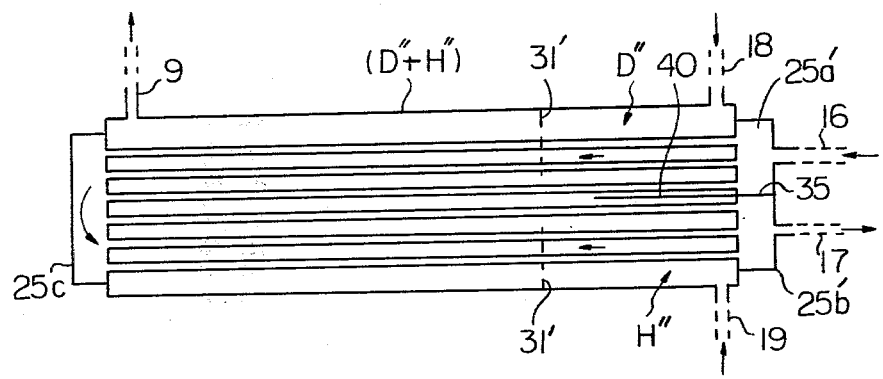

In FIG. 5, there is shown another embodiment of the composite heat exchanger wherein the refrigerant is directed in one direction and returned in the opposite direction through the second generator portion D" and the third heat exchanger portion H", respectively within the composite heat exchanger. To such end, at one side of the composite exchanger, a composite header consisting of parts 25a' and 25b' separated by a partition 35 is disposed to which the vapor conduit 16 and the line 17 are connected. At the opposite end of the composite heat exchanger, another header 25c is disposed so as to direct the refrigerant fed from the part 25a' back to the part 25b'. In order to prevent the refrigerant from mixing at a place immediately down stream of the header part 25a' or immediately before the header part 25b', a baffle plate 40 is disposed between a second generator portion D" and a third heat exchanger portion H" so as to separate them over a suitably length in the longitudinal direction.

Also, if necessary, a baffle plate or plates 31' may be disposed so as to promote the intermixing of the solution.

Figure 6:
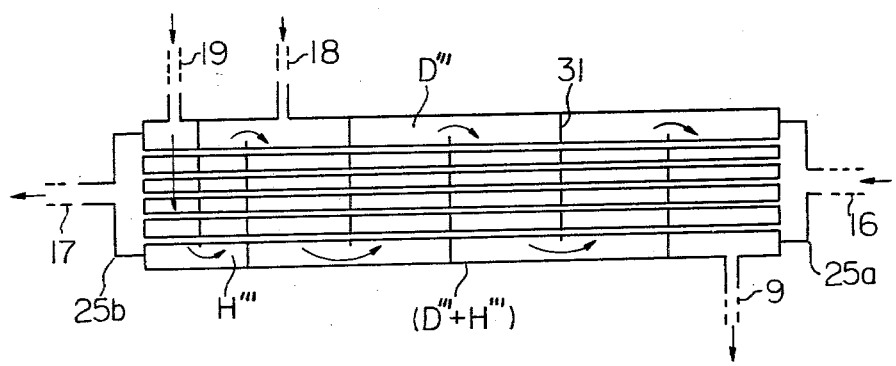

FIG. 6 shows a further modified form of the composite heat exchanger which is somewhat similar to that shown in FIG. 3. In this embodiment, the bypass line 18 and the return conduit 9 are disposed in a manner opposite that shown in FIG. 3 whereby the solution passed through a third heat exchanger portion H'" is added to the solution coming from the bypass line 18 and the total amount of the solution from the lines 19 and 18 flows through a second generator portion D'" thereby making it easy to increase the flow rate of the solution in the second generator portion D'".

As explained in detail with reference to the embodiments, the heat energy contained in the refrigerant delivered from the second generator is recovered without wasting it in the coolant in the condenser whereby the corresponding amount of the heat energy otherwise required in the first generator need not be supplied by the heat source whereby a considerable improvement in thermal efficiency of the system is achieved. Further, due to the recovery of the heat energy heretofore wasted, the volume of the cooling medium required for the condenser is also reduced which may result in saving coolant whereby the capacities of associated equipment such as a cooling tower and a feed pump can be made smaller. Therefore the total power consumed by the system can also be reduced. Further, the concentration of the solution at the outlet portion of the second generator is also reduced thereby reducing the possibility of crystallization of the solution and assuring the stable and safe operation of the system by the simple construction as explained above. Also, the use of the unitary construction of the third heat exchanger and the second generator makes the whole system more compact.

The present invention has been explained in detail with respect to the preferred embodiments thereof; however, the present invention is not limited to those modifications and variations are easily realized by those skilled in the art within the scope of the present invention defined in the appended claims.

What is claimed is:

1. A double effect absorption refrigerating system comprising:
   an evaporator having therein a line for passing medium to be chilled;
   an absorber associated with said evaporator;
   a first generator associated with a heat source;
   a second generator;
   a condenser associated with said second generator;
   means for circulating solution from the absorber to the first generator and thence to the second generator and back to the absorber and including a solution conduit having a first portion between said first generator and said second generator;
   means for directing refrigerant from the first generator to the evaporator through the second generator and the condenser and including a refrigerant conduit having a first portion downstream of said second generator; and
   a solution-refrigerant heat exchanger to which said conduit portions are connected to pass solution in said first portion of said solution conduit and refrigerant in said first portion of said refrigerant conduit downstream of said second generator through said solution-refrigerant heat exchanger in heat exchange relationship for effecting heat transfer between the solution and refrigerant.

2. A double effect absorption refrigerating system as claimed in claim 8 further comprising a high level heat exchanger, and said solution circulating means includes a second solution conduit portion between said absorber and said first generator, said first solution conduit portion being connected to said high level heat exchanger upstream of said solution-refrigerant heat exchanger and said second solution conduit portion being connected to said high level heat exchanger for passing the solution in said second solution conduit portion and said first solution conduit portion through said high level heat exchanger in heat exchange relationship for raising the temperature of the weak solution fed from the absorber to the first generator.

3. A double effect absorption refrigerating system as claimed in claim 2 further comprising a low level heat exchanger, and said solution circulating means includes a third solution conduit portion between said second generator and said absorber and connected to said low level heat exchanger for passing the solution discharged from said second generator through said low level heat exchanger and said second solution conduit being connected to said low level heat exchanger for passing the weak solution from the absorber through said low level heat exchanger in heat exchange relationship with the solution discharged from said second generator from raising the temperature of the weak solution fed from the absorber to the first generator.

4. A double effect absorption refrigerating system as claimed in claim 3 further comprising a solution bypass line connected to said second solution conduit portion between said high level heat exchanger and said low level heat exchanger and to said second generator for directing a portion of the weak solution from said absorber to said second generator.

5. A double effect heat absorption refrigerating system as claimed in claim 4 wherein said second generator and said solution-refrigerant heat exchanger are combined in a single unit.

6. A double effect absorption refrigerating system as claimed in claim 5 wherein said single unit has a first zone and a second zone corresponding to said second generator and said solution-refrigerant heat exchanger, respectively, said first solution conduit portion being connected to said second zone for introducing solution concentrated in said first generator into said second zone, and said refrigerant conduit from said first generator being connected to said first zone for introducing refrigerant from said first generator into said first zone, the refrigerant then being introduced into the second zone where heat transfer is effected between the solution and the refrigerant passed through the first zone.

7. A double effect absorption refrigerating system as claimed in claim 6 wherein said bypass is connected to said first zone.

8. A double effect absorption refrigerating system as claimed in claim 7 wherein said solution bypass line is connected to said single unit at the upstream end of said first zone, whereby the bypassed solution is combined with the concentrated solution from said second zone and the combined solutions flow through said first zone.

* * * * *